United States Patent [19]
Draxler

[11] 4,043,532
[45] Aug. 23, 1977

[54] VALVE WITH ELECTRICALLY OPERATED ACTUATOR

[75] Inventor: Helmut J. Draxler, Warwick, R.I.

[73] Assignee: New England Union Co., West Warwick, R.I.

[21] Appl. No.: 653,535

[22] Filed: Jan. 29, 1976

[51] Int. Cl.² .............................................. F16K 31/04
[52] U.S. Cl. .................... 251/11; 236/68 R; 60/527
[58] Field of Search ............. 251/11; 236/68 R, 99 G; 60/527; 337/120; 219/511, 543

[56] References Cited
U.S. PATENT DOCUMENTS

| | | | |
|---|---|---|---|
| 1,643,858 | 9/1927 | Sauvage | 251/11 X |
| 3,540,479 | 11/1970 | Thompson | 251/11 X |
| 3,808,403 | 4/1974 | Kanaya et al. | 219/543 X |

Primary Examiner—Arnold Rosenthal
Attorney, Agent, or Firm—Salter & Michaelson

[57] ABSTRACT

An electrically operated valve having a valve body in which a valve member is mounted for movement to an open or closed position, an operating assembly being removably mounted on the body and including a heat motor that is offset with respect to the axis of the valve member and that is operable to effect movement of the valve member against the action of a control spring as also mounted in the operating assembly, the heat motor having a thermal switch mounted directly thereon for controlling current to the heating element thereof and thereby protecting the heat motor for increased life thereof.

14 Claims, 7 Drawing Figures

VALVE WITH ELECTRICALLY OPERATED ACTUATOR

BACKGROUND OF THE INVENTION

The present invention relates to a flow-control valve for controlling flow of a heating fluid that is utilized to heat an environment, a thermostat located in the environment controlling current to a heat motor that, in turn, effects operation of the valve.

Flow-control valves for use in controlling fluid in the heating of an enclosed area or a machine or the like are quite common in the art and have normally included some form of a thermostat located in the environment to be heated that causes the valve to be opened or closed in accordance with a predetermined temperature of the environment. Prior to the instant invention, such flow-control valves have sometimes included electrically operated units having a solenoid operated device incorporated therein; and, although such a device served the purpose of opening or closing the valve as required, these devices were not always satisfactory for use in temperature control situation. Heat motors have also been incorporated in flow control devices and have been particularly useful in producing the required operation of a valve member because of the special characteristics of operation of a heat motor. However, the prior known devices that included heat motors did not provide for effective protection of the heat motor during the operation thereof; and, oftentimes, the heat motor would be burned out due to failure of the unit. It is also important in some instances to enable the control valve to be placed in a normally open position if for any reason the control device malfunctions and must be replaced. In the prior known devices, failure or malfunction of the heat motor or related control accessories resulted in a closing of the valve, which was not desirable if the valve unit had to be cleaned or otherwise serviced upon removal of the heat motor or control unit from the assembly.

Further, the prior known heat motor was somewhat ineffecient in the operation thereof since the heating elements associated therewith were assembled in layers and did not contribute altogether to an effective heating of the temperature responsive material within the motor. Under these conditions, unnecessary current was consumed that increased the cost of operation of the device. In most of the prior known heating units as employed for the control of fluid passing through a valve unit, the heat motor was responsive to the temperature of a thermostatic switch and protection of the heat motor was only accomplished through an end switch as associated therewith. Such end switches did not effectively protect the heating element because of the mechanical movement involved; and, quite frequently, the efficiency of the heat motor was materially reduced after only a short period of use.

The present invention is designed to overcome the above stated objections to the prior art devices, as will be hereinafter set forth.

SUMMARY OF THE INVENTION

The present invention relates to an electrically operated valve that includes a body having inlet and outlet passages formed therein, a valve member being located in the valve body for controlling the flow of a fluid therethrough. An elongated valve stem is operatively interconnected to the valve member and extends outwardly of the valve body, and an operating assembly is removably mounted on the valve body and is operative to control movement of the stem for producing a controlled movement of the valve member. The operating assembly includes a bracket through which the stem extends; and an electrically operated heat motor is operatively mounted on the bracket, the longitudinal axis of the heat motor being offset with respect to the longitudinal axis of the stem. A control spring is also mounted on the bracket and is offset with respect to the axes of both the stem and the heat motor and urges a plate member as mounted on the bracket into engagement with the stem for normally locating the stem and valve member associated therewith in a closed position. The heat motor is energized in response to operation of the thermostat located in the environment heated by the fluid flowing through the valve, wherein the pressure of the plate member on the stem is relieved to enable the valve member to move to an open position. The heat motor also includes a thermal switch that is mounted directly thereon and that is normally closed but that is operable at a predetermined temperature to open the circuit to the heat motor, thereby protecting the heat motor against overheating and by so doing increasing the left expectancy thereof.

Accordingly, it is an object of the present invention to provide an electrically operated valve that includes an assembly that is removably mounted on the body of the valve and that is operative to effectively control the flow of fluid therethrough in accordance with a predetermined temperature of the environment that is heated by the fluid flowing through the valve.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
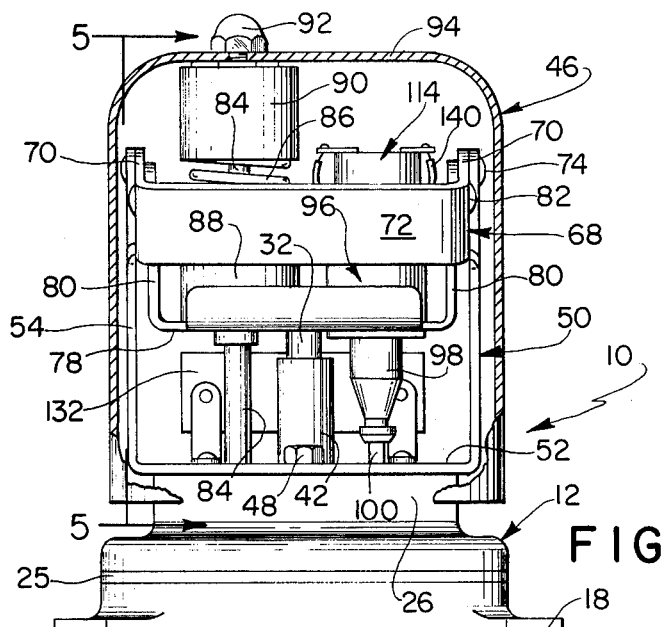
FIG. 1 is a side elevational view of the valve construction embodied in the present invention, the cover of the operating assembly as mounted on the valve body being cut away to illustrate the construction of the operating assembly therein.
Figure 2:
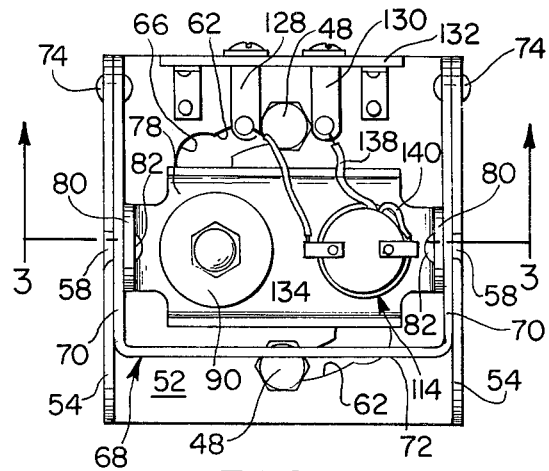
FIG. 2 is a top plan view of the operating assembly of the valve construction with the cover thereof removed.
Figure 3:
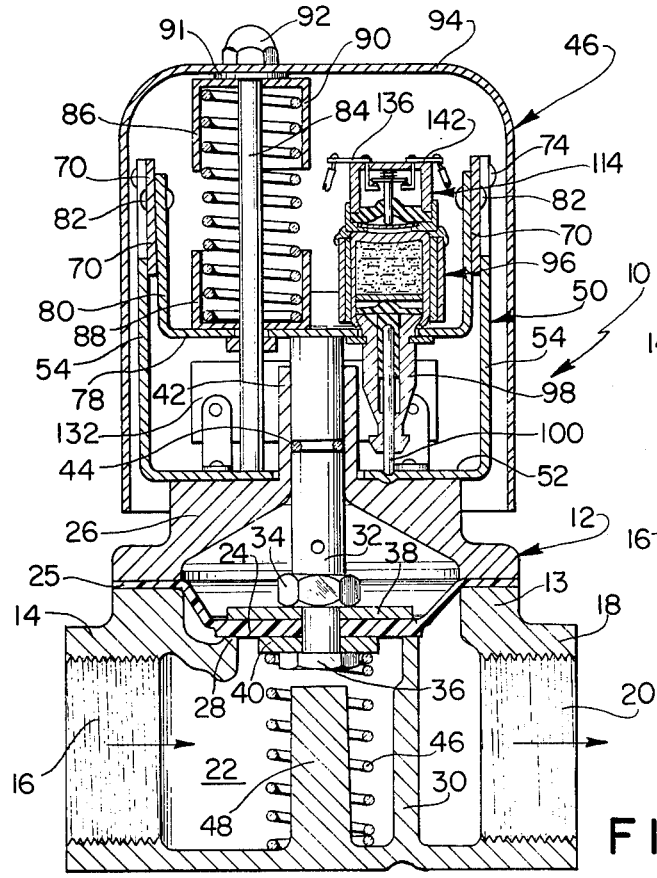
FIG. 3 is a sectional view taken along line 2—2 in FIG. 2, showing the valve construction in the closed position thereof.
Figure 4:
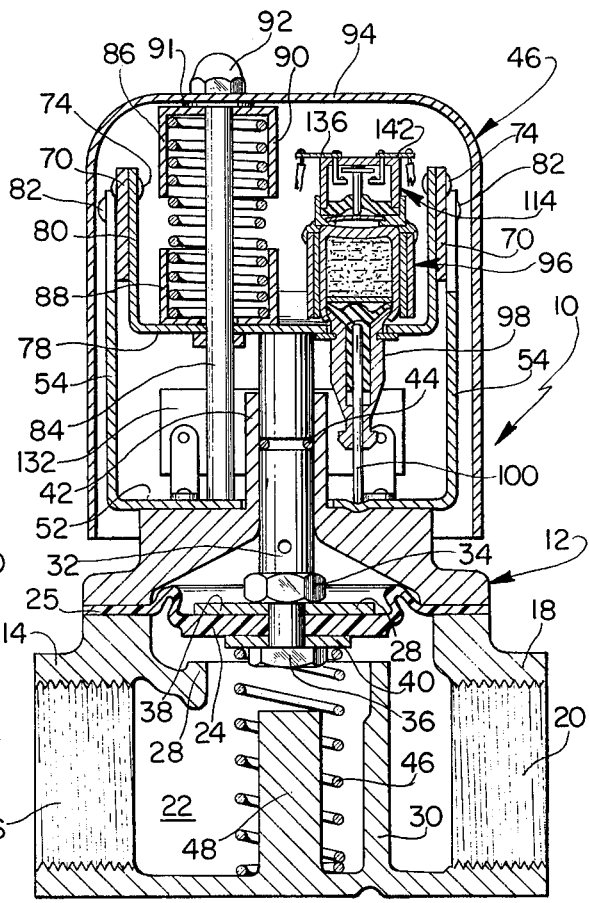
FIG. 4 is a view similar to FIG. 3 and showing the valve construction in the open position thereof.

Referring now to the drawings and particularly to FIGS. 1-4, the valve construction embodied in the present invention is illustrated and is generally indicated at 10. As shown, the valve construction 10 includes a valve body generally indicated at 12, having a lower portion 13 defined by an inlet portion 14 in which an inlet passage 16 is formed. An outlet portion 18 is also formed as part of the lower portion 13 of the body 12 and has an outlet passage 20 formed therein. The inlet passage 16 communicates with a chamber 22 formed in the lower portion 13 and into which fluid is directed, the chamber 22 communicating with the outlet passage 20 by way of a valve opening, the flow of fluid therethrough being controlled by a valve member 24. As illustrated in FIGS. 3 and 4, the valve member 24 is integrally joined to a diaphragm 25 that is secured between the lower portion 13 of the valve body 12 and an upper portion 26. A valve seat 28 is formed in the lower portion 13 of the valve body 12 as part of an extension of the inlet 14, the uppermost end of an upstanding barrier 30 cooperating with the extension of the inlet to form the complete seat 28. Movement of the valve member 24 is controlled by an elongated vertically extending stem 32 that has a nut 34 mounted adjacent to the lower end thereof and that is internally threaded at the lowermost end thereof to receive a threaded nut 36. The valve member 24 is secured to the stem 32 between stiffeners 38 and 40, and nuts 34 and 36 sandwiching the stiffeners 38 and 40 and the valve member 24 therebetween as a unit. A cross hole is formed in the stem 32 above the nut 34 and communicates with an interior bore in the stem to enable line fluid to enter the chamber above the diaphragm 25, for aiding in the closing of the valve.

Formed as an integral part of the upper portion 26 of the valve body is a tubular extension 42 through which the stem 32 extends, an O-ring seal 44 being mounted on the stem 32 for engagement with the interior of the tubular portion 42 for effectively sealing the interior of the valve body. The stem 32 is urged to an upper or open position by a lower spring 46 that is mounted on an upstanding spring guide 48 located in the chamber 22 of the valve body. The spring 46 engages the underside of the stiffener 40 and is calibrated to exert a force on the diaphragm-type valve member 24 and the stem 32 to urge the valve member 24 to the open position.

Figure 5:
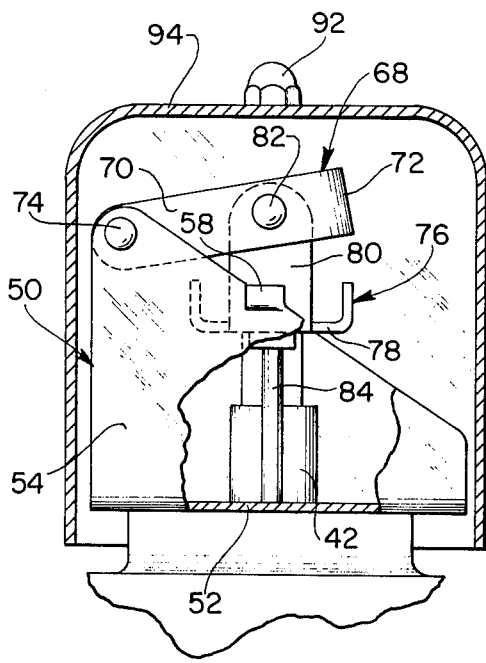
FIG. 5 is a sectional view taken along line 5—5 in FIG. 1 also showing the valve construction in the closed position thereof.
Figure 6:
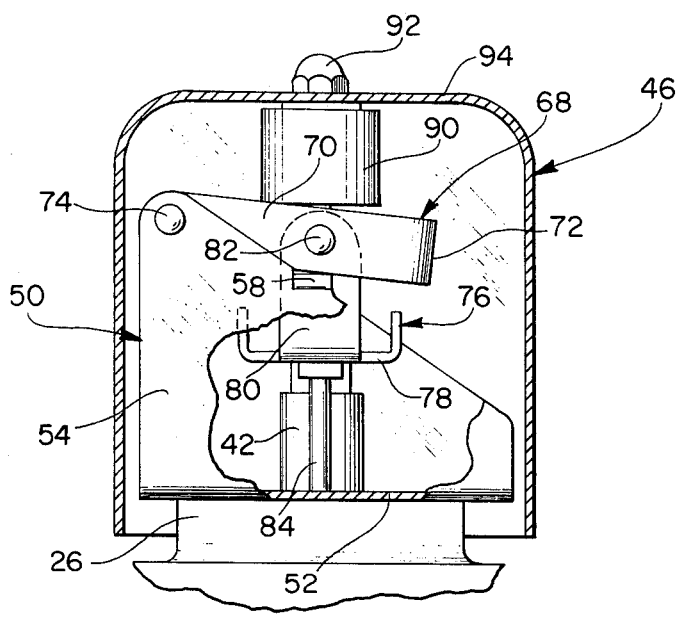
FIG. 6 is a view similar to FIG. 5 showing the valve construction in the open position thereof.

Mounted on the upper portion 26 of the valve body 12 is an operating assembly generally indicated at 46; and, as will be described hereinafter, the operating assembly 46 is designed to control the operating movement of the valve member 24 in accordance with the temperature requirements of the environment that the fluid passing through the valve construction 10 heats. In order to locate the operating assembly 46 in place, bolts 48 (FIG. 2) are fixed in spaced relation on the uppermost surface of the upper portion 26 of the valve body. A bracket generally indicated at 50 is removably mounted on the upper portion 26 of the valve body by the bolts 48 and for this purpose is formed with a bottom wall 52 to which side walls 54 are joined to perpendicular relation with respect thereto. As illustrated in FIGS. 5 and 6, the side walls 54 have a generally triangular configuration, stops 58 being formed on the inclined edges intermediate the ends thereof, the purpose of which will be described hereinafter. Formed in the bottom wall 52 are curved bayonet slots 62, each of which is formed with an enlarged opening 66 that is sized to receive the head of a bolt 48 therein. A smaller opening (not shown) also communicates with the other end of each slot 62 and receives the shank of a bolt 48 when the bracket 50 is mounted in place. Thus, the heads of the bolts 48 are received in the enlarged openings 66 of the bayonet slots 64 and the bracket is then rotated to the position illustrated in FIG. 2.

Assembled on the bracket 50 prior to the mounting thereof on the valve body 12 are the other component parts as illustrated; and, as shown in FIGS. 3 and 5, a U-shaped lever 68 is pivotally joined to the uppermost ends of the side walls 56 of the bracket 50. The lever 68 includes arms 70 connected by a bight portion 72, the arms 70 being pivotally joined to the upper ends of the walls 56 of the bracket 50 by the pivot pins 74. Mounted interiorly of the arms 70 of the lever 68 is a plate member generally indicated at 76 that is defined by a base 78 and upstanding legs 80. The legs 80, as illustrated in FIGS. 3 and 5, are joined to the arms 70 of the lever 68 intermediate the ends thereof by a pin 82.

Fixed to the bottom wall 52 of the bracket 50 and projecting upwardly therefrom is an elongated post 84. The post 84 extends through an opening formed in the base 78 of the plate member 76 and is offset with respect to the center of the base 78 and under which the stem 32 is located. Extending around the post 84 and mounted on the plate member 76 is a spring 86 that is retained in place by a lower spring retainer cup 88 and an upper spring retainer cup 90, the upper retainer cup 90 being fixed in position by a retainer ring 91 that is located interiorly of a housing 94. An end cap 92 is mounted on the outer end of the bolt 84 for securing the housing 94 in place as will be described.

As illustrated in FIGS. 3 and 4, the tubular portion 42 through which the stem 32 projects extends through an opening in the bottom wall 52 of the bracket 50 to locate the uppermost end of the step 32 directly beneath the base 78 of the plate member 76. The spring 86 urges the plate member 76 downwardly into engagement with the uppermost end of the step 32, the underside of the centermost portion of the base 78 engaging the uppermost end of the stem 32 so that the longitudinal axis of the stem 32 is offset with respect to the longitudinal axis of the spring 86 and the post 84 on which the spring is mounted.

Figure 7:
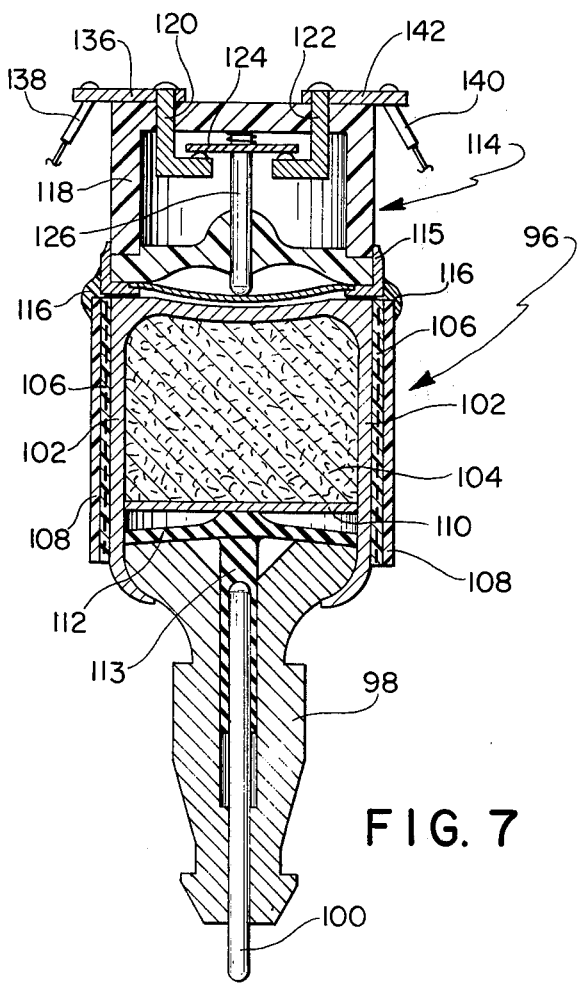
FIG. 7 is a sectional view of the heat motor and thermal switch mounted thereon as located on the operating assembly of the present invention.

The spring 86 normally overcomes the force of the spring 46 and retains the valve member 24 in the closed position thereof when the valve 10 is located in the operating position thereof; and in this connection the arms 70 of the lever 68 engage the stops 60 (FIG. 5) that limit the downward stroke of the plate member 76 and thus protects the valve member 24 in the engagement thereof with the valve seat 28. When flow of fluid through the valve construction 10 is demanded in accordance with a thermostatic setting of the controlled environment, it is necessary to move the plate member 76 to an upper position to allow the stem 32 to move upwardly by the force of the spring 46. In order to accomplish this purpose, a heat motor generally indicated at 96 in FIG. 7 is provided. The heat motor 96 is also mounted on the base 78 of the plate member 76 and includes a lower body portion 98 that projects through an opening in the base 78, a suitable washer locking the heat motor 96 to the base 78. A piston 100 projects outwardly of the lower body portion 98 of the heat motor 96, the lowermost end of the piston 100 engaging a dimple formed in the bottom wall 52 of the bracket. As will be described, as a force is exerted on the piston 100 to urge it outwardly, the engagement of the piston 100 with the bottom wall 52 of the bracket will produce a reaction that will lift the plate member 76 upwardly.

Referring now to FIG. 7, the heat motor 96 is shown including a cylinder 102 in which a heat responsive material 104 such as wax and copper filings is located, the heat responsive material 104 being heated by a uniquely constructed printed circuit heating element 106 that is wrapped around the cylinder 102 and that is supplied with current from a source for producing the necessary heat for operation of the unit. Contrasted with the prior known constructions, only the single printed circuit heating element 106 is required, the heating element 106 being insulated by an outer insulating sleeve 108. The printed circuit heating element 106 is defined by a film of silicone rubber on which nickel chrome conductors are fixed. As described, only a single layer of insulating material is necessary to insulate the heating element 106 and this is defined by the insulating sleeve 108 that is also formed of a silicon rubber material. The heat motor 96 is of known construction and includes an interior disc 110 that is responsive to the liquification and expansion of the material 104 located in the cylinder 102. The disc 110 is engageable with a membrane 112 located in contact with a flexible boot 113 in which the piston 100 is secured. Thus, as the material 104 within the cylinder 102 expands, the membrane 112 urges the boot 113 outwardly to move the piston 100 accordingly.

In contrast to prior known heat motor constructions the present invention provides a safety feature that prevents the heat motor from being overheated which would reduced the life expectancy thereof. In order to accomplish this purpose, a thermal switch generally indicated at 114 is provided, a metal cup 115 of the thermal switch 114 being directly mounted on the uppermost end of the cylinder 102 and being secured thereto by an adhesive 116. The thermal switch 114 includes a body 118 that is fixed in the metal cup 115 and that has contacts 120 and 122 located interiorly thereof with which a contact disc 124 normally engages for producing a continuous circuit through the switch. A bimetallic element 124 that engages a transfer pin 126 is also secured to the contact disc 124; and when the temperature within the cylinder 102 reaches a predetermined point, the bimetallic disc 124 is actuated to urge the transfer pin 126 upwardly thereby breaking the circuit between the terminals 120 and 122. Thus, the normally closed thermal switch 114 opens the circuit to the heat motor 96 and prevents the overheating thereof. The thermal switch 114 is calibrated to open the circuit to the heat motor 96 within a prescribed temperature range; and even though the heat motor 96 is deenergized for a short period of time when the circuit is broken in the switch 114, the valve member 24 will not normally close. This is so since the thermal switch 14 only temporarily breaks the circuit to the heat motor 96; and before the valve moves to a closed position, the switch 114 is operable to again close the circuit therein. As previously described, the movement of the stem 32 in the valve construction is dependent upon the temperature of the environment that the valve controls; and therefore a thermostat suitably located in the environment normally controls the current through the thermal switch 114 and heat motor 96 for opening and closing the valve.

As further illustrated in FIGS. 3-6, when the heat motor 96 is energized and the piston 100 forced outwardly, a reaction force is exerted on the body of the heat motor and the plate member 76 on which it is mounted. Since the plate member 76 is mounted on the post 84 and is pivotally secured to the lever 68, the reactive force as exerted by the heat motor on the plate member 76 causes the plate member 76 to move upwardly in a linear direction following the direction of the post 84. As the plate member 76 moved upwardly, the pressure on the uppermost end of the stem 32 is relieved; and, as shown in FIG. 4, the spring 46 moves the valve member 24 upwardly to the open position thereof. The upper or open position of the operating assembly is also illustrated in FIG. 6. When the heat motor 96 is deenergized through actuation of the thermostat located in the environment being controlled, the piston 100 will, in effect, be retracted in the heat motor and the spring 86 exerts a sufficient force on the plate member 76 to force the stem 32 downwardly to close the valve member 24, thereby sealing communication between the inlet passage 16 and the outlet passage 20.

As shown in FIG. 2, current to the heat motor 96 is conducted thereto through terminals 128 and 130 mounted on an upstanding terminal board 132, the terminal board 132 being secured to the bottom wall 52 of the bracket 50. A lead 134 interconnects the terminal 128 to a terminal 136 mounted on the thermal switch 114, while a lead 138 connects the terminal 130 to a terminal (not shown) interconnected to the heater element 106 of the heat motor 96. A third electrical lead 140 interconnects a terminal 142 mounted on the thermal switch 114 to a second terminal of the heater element of the heat motor 96 to complete the circuit thereto.

As further illustrated in FIGS. 1-3, the cover 94 is normally mounted around the component parts of the operating assembly 46 and is secured in place on the post 84 that extends through the upper wall of the cover, the nut 92 engaging the exposed threaded end of the post 84 for locking the cover 94 in position.

One of the unique features of the present invention is the construction of the valve body 12 and the operating assembly body 46 as independent units. If for any reason a component part of the operating assembly 46 is defective and must be replaced, the operating assembly can be entirely removed from the valve body 12 by rotating the operating assembly bracket 50 and lifting the bracket and the parts mounted thereon from the valve body. Since the spring 46 normally urges the valve member 24 to an open position, removal of the operating assembly 46 automatically opens the valve. This is desired, since on occasion it may be necessary to provide free flow through the valve for the cleaning thereof or for any other purpose. If necessary, the plunger 32 can be moved to a lower position thereof and locked in place by any suitable means. This will in effect close the valve, even if the operating assembly 46 is removed from the unit.

The heat motor 96 as described hereinabove represents a unique departure from prior known constructions that incorporate heat motors, since the operating parts of the heat motor are effectively protected from overheating by the thermal switch 114 mounted in engagement therewith. The thermal switch 114 is calibrated to deenergize the heat motor 96 at a predetermined temperature, usually at approximately 250° F; and thus, the heat motor is effectively protected from overheating which increases the life expectancy thereof. Further, the use of the printed circuit heater 106 avoids the heat loss normally experienced in the prior known heater assembly that usually incorporated two or more layers of heating elements around the cylinder of the heat motor. Such a construction also necessitated the use of additional insulating layers, which was inefficient and required considerably more current than the unit of the present invention, wherein only a single insulating sleeve is utilized.

What is claimed is:

1. An electrically operated valve comprising a body having inlet and outlet passages formed therein, a valve member located between said inlet and outlet passages for controlling the flow of a fluid therethrough, a valve stem operatively interconnected to said valve member for producing controlled movement thereof and extending outwardly relative thereto and said valve body, and an operating assembly mounted on said valve body and operatively engaging said stem for producing the controlled movement thereof, said operating assembly including a bracket through which said stem extends, an electrically operated heat motor operatively mounted on said bracket, the axis of said heat motor being offset with respect to the axis of said stem, and resilient means operatively mounted on said bracket and being offset relative to said stem and normally urging said stem inwardly to locate said valve member in a closed position, said operating assembly including a plate member mounted for substantial linear movement on said bracket and engaging said stem, and said resilient means being mounted on said plate member for normally urging said plate member inwardly to locate said stem in the closed position thereof, the axis of said resilient means also being offset relative to said heat motor.

2. An electrically operated valve as claimed in claim 1, said operating assembly including a plate member mounted for substantial linear movement on said bracket and engaging said stem and said resilient means being mounted on said plate member for normally urging said plate member inwardly to locate said stem in the closed position thereof.

3. An electrically operated valve as claimed in claim 1, said heat motor including a cylinder in which a heat responsive material is located, means for electrically heating said material, a piston extending outwardly of said cylinder and into engagement with said bracket and being operable to exert a thrust against said bracket upon effective heating of said heat responsive material.

4. An electrically operated valve comprising a body having inlet and outlet passages formed therein, a valve member located between said inlet and outlet passages for controlling the flow of a fluid therethrough, a valve stem operatively interconnected to said valve member for producing controlled movement thereof and extending outwardly relative thereto and said valve body, and an operating assembly mounted on said valve body and operatively engaging said stem for producing the controlled movement thereof, said operating assembly including a bracket through which said stem extends, an electrically operated heat motor operatively mounted on said bracket, the axis of said heat motor being offset with respect to the axis of said stem, and resilient means operatively mounted on said bracket and being offset relative to said stem and normally urging said stem inwardly to locate said valve member in a closed position, said operating assembly including a plate member mounted for substantial linear movement on said bracket and engaging said stem, and said resilient means being mounted on said plate member for normally urging said plate member inwardly to locate said stem in the closed position thereof, said heat motor being mounted on said plate member and including a piston that is engageable with said bracket, wherein energizing of said heat motor produces a thrust of said piston against said bracket and a corresponding outward movement of said plate member against the action of said resilient means, thereby relieving the pressure on said stem and enabling said stem and valve member to be moved to the open position thereof.

5. An electrically operated valve as claimed in claim 4, a lever pivotally mounted on said bracket and interconnected to said plate member, the pivotal movement of said lever as interconnected to said plate member and bracket providing for the linear movement of said plate member.

6. An electrically operated valve as claimed in claim 5, said lever having a "U" configuration defined by opposed arms and a bight portion, the ends of said arms being pivotally connected to said bracket, said plate member having legs that are pivotally connected to said arms intermediate the ends thereof, wherein said lever guides said plate in a linear direction in response to the action of said resilient means or thrust of said piston.

7. An electrically operated valve comprising a body having inlet and outlet passages formed therein, a valve member located between said inlet and outlet passages for controlling the flow of a fluid therethrough, a valve stem operatively interconnected to said valve member for producing controlled movement thereof and extending outwardly relative thereto and said valve body, and an operating assembly mounted on said valve body and operatively engaging said stem for producing the controlled movement thereof, said operating assembly including a bracket through which said stem extends, an electrically operated heat motor operatively mounted on said bracket, the axis of said heat motor being offset with respect to the axis of said stem, and resilient means operatively mounted on said bracket and being offset relative to said stem and normally urging said stem inwardly to locate said valve member in a closed position, said heat motor including a cylinder in which a heat responsive material is located, means for electrically heating said material, a piston extending outwardly of said cylinder and into engagement with said bracket and being operable to exert a thrust against said bracket upon effective heating of said heat responsive material, a thermal switch mounted directly on said heat motor and electrically interconnected to said heating means for normally directing a heating current thereto, said thermal switch being operable to break the circuit to said heating means upon the heating means reaching a predetermined temperature.

8. An electrically operated valve as claimed in claim 7, said heat motor further including a flexible printed circuit heater that is wrapped around the exterior of said cylinder in close engagement therewith for transmitting heat to the material interiorly thereof, and a sleeve defined by a single layer of insulating material surrounding said heater for effectively insulating said heater.

9. A valve construction, comprising a body having inlet and outlet passages through which a heated fluid is directed for effectively heating an environment to a predetermined temperature, a valve member for controlling communication between said passages, a valve stem interconnected to said valve member for controlling the movement thereof, an operating assembly mounted on said valve body and including a heat motor, the longitudinal axis of which is parallel to but offset from the longitudinal axis of said valve stem, a plate member on which said heat motor is mounted and engaging the outermost end of said valve stem, and a spring mounted on said plate member, the longitudinal axis of said spring being parallel to but displaced from the longitudinal axes of said valve stem and heat motor, said spring being operable to normally urge said plate member in a direction toward said valve stem that is located in engagement therewith for urging said valve stem inwardly of said valve body for locating said valve member in the closed position thereof, and said heat motor being operable in response to a predetermined temperature therein for urging said plate member outwardly of said valve stem and against the action of said spring to enable said valve stem to move outwardly of said valve body, wherein said valve member is moved to an open position.

10. A valve construction as claimed in claim 9, said operating assembly including a bracket that is removably mounted on said body, said plate member being operatively mounted on said bracket and movable relative thereto, said bracket including a bottom plate having an opening through which said valve stem extends for engagement with said plate member.

11. A valve construction as claimed in claim 10, a bolt secured to said bottom plate and extending outwardly therefrom through an aligned opening in said plate member that is spaced from said bottom plate in parallel relation, said spring being mounted on said bolt on said plate member for normally urging said plate member inwardly into engagement with said valve stem.

12. A valve construction as claimed in claim 11, said operating assembly further including a lever having spaced, parallel arms that are pivotally connected to said bracket, said plate member being interconnected to said arms so that said arms provide for controlled and guided movement of said plate member on said bracket during operation of said heat motor.

13. A valve construction as claimed in claim 12, said heat motor including a piston that is longitudinally movable in response to operation of said motor, said piston continuously engaging the bottom plate of said bracket, wherein an outward movement of said piston causes the plate member on which the heat motor is mounted to be moved relative to said bracket, thereby producing a corresponding movement of said valve stem.

14. An electrically operated valve comprising a body having an inlet and outlet passages formed therein, a valve member located between said inlet and outlet passages for controlling the flow of a fluid therethrough, a valve stem operatively interconnected to said valve member for producing controlled movement thereof and extending outwardly relative thereto and said valve body, an operating assembly mounted on said valve body and operatively engaging said stem for producing the controlled movement thereof, said operating assembly including a bracket through which said stem extends, an electrically operated heat motor operatively mounted on said bracket, resilient means operatively mounted on said bracket and normally urging said stem inwardly to locate said valve member in a closed position, said heat motor including a cylinder in which a heat responsive material is located, means for electrically heating said material, a piston extending outwardly of said cylinder and into engagement with said bracket and being operable to exert a thrust against said bracket upon effective heating of said heat responsive material, a thermal switch mounted directly on said heat motor and electrically interconnected to said heating means for normally directing a heating current thereto, said thermal switch being operable to break the circuit to said heating means upon the heating means reaching a predetermined temperature, said heat motor further including a flexible printed circuit heater that is wrapped around the exterior of said cylinder in close engagement therewith for transmitting heat to the material interiorly thereof, and a sleeve defined by a single layer of insulating material surrounding said heater for effectively insulating said heater.

* * * * *